United States Patent [19]

Oeste

[11] Patent Number: 5,689,798
[45] Date of Patent: Nov. 18, 1997

[54] METHOD AND APPARATUS FOR REMOVING UNDESIRABLE CHEMICAL SUBSTANCES FROM GASES, EXHAUST GASES, VAPORS, AND BRINES

[75] Inventor: Franz Dietrich Oeste, Münzenberg, Germany

[73] Assignees: Olga Dietrich, Arnheim, Netherlands; Robert Aalbers, Münster, Germany

[21] Appl. No.: 534,535

[22] Filed: Sep. 27, 1995

Related U.S. Application Data

[60] Division of Ser. No. 237,960, May 3, 1994, Pat. No. 5,480,524, which is a continuation-in-part of Ser. No. 991,794, Dec. 17, 1992, abandoned.

[30] Foreign Application Priority Data

Dec. 21, 1991 [DE] Germany ............. 41 42 520.0
Dec. 2, 1992 [DE] Germany ............. 42 41 451.2

[51] Int. Cl.$^6$ ............................................. B01J 19/12
[52] U.S. Cl. ................. 422/186.3; 422/186; 422/168; 588/900
[58] Field of Search ................. 422/168, 186, 422/186.3, 900, 906; 210/748; 204/158.2, 164; 588/210, 212, 219, 222, 225, 237, 243, 247, 900

[56] References Cited

U.S. PATENT DOCUMENTS

| | | | |
|---|---|---|---|
| 4,446,236 | 5/1984 | Clyde | 435/287 |
| 4,892,712 | 1/1990 | Robertson et al. | 422/186 |
| 5,045,288 | 9/1991 | Raupp et al. | 422/186.3 |
| 5,137,607 | 8/1992 | Anderson et al. | 204/59 R |
| 5,449,443 | 9/1995 | Jacoby et al. | 204/157.3 |
| 5,480,524 | 1/1996 | Oeste | 204/158.2 |

*Primary Examiner*—Charles T. Jordan
*Assistant Examiner*—Daniel Jenkins
*Attorney, Agent, or Firm*—Anderson Kill & Olick P.C.

[57] ABSTRACT

The present invention relates to a method and pertinent apparatus for purifying gases, exhaust gases, vapors, and brines, which are contaminated with undesirable chemical substances or contain high concentrations of these substances, by means of photocatalytic reactions occurring on the surface of catalysts.

The catalysts are situated in a fixed or fluidized bed on catalyst carriers. In fluidized beds, the catalysts themselves can serve as catalyst carriers. The substrates to be purified are fed through a closed system which contains the catalyst carriers and catalysts.

In the fixed-bed catalytic method, the catalyst carrier/catalyst system continuously or discontinuously passes through a washing zone to remove the generated mineralization products. The reaction is induced by shortwave photons of wavelengths between 250 and 400 nm.

12 Claims, 4 Drawing Sheets

METHOD AND APPARATUS FOR REMOVING UNDESIRABLE CHEMICAL SUBSTANCES FROM GASES, EXHAUST GASES, VAPORS, AND BRINES

This is a divisional application of Ser. No. 08/237,960, filed May 3, 1994, now U.S. Pat. No. 5,480,524 which in turn is a continuation-in-part application of Ser. No. 07/991,794, filed Dec. 17, 1992, now abandoned.

BACKGROUND OF THE INVENTION

1. Field of the Invention

The present invention relates to a method and apparatus for purifying fluids and, in particular, for purifying exhaust gases, vapors, and brines, which are contaminated with undesirable chemical substances or contain high concentrations of these substances, by means of photocatalytic reactions occurring on the surface of catalysts.

2. Description of the Prior Art

The catalysts are situated on catalyst carriers in a fixed bed or in a fluidized bed. In fluidized beds, the catalysts themselves can serve as catalyst carriers. The substrates to be purified are fed through a closed system which contains the catalyst carriers and catalysts.

In the fixed-bed catalytic process, the catalyst carrier/catalyst system continuously or discontinuously passes through a washing zone to remove the generated mineralization products. The reaction is induced by shortwave photons of wavelengths between 250 and 400 nm. Endothermic chemical reactions require energy. Energy can be supplied in numerous ways. Frequently, photons of various wavelengths are employed. Since these reactions occur at relatively low temperatures, catalysts are added to accelerate the reaction. In the following, this combination of inducing chemical reactions by photons and increasing the speed of reactions by catalysts will be referred to as photocatalysis.

Photocatalyzed chemical reactions have been the subject of increasing attention for some time. Applications have been sought for these reactions in the area of environmental protection.

In Environmental Sci. Technol. Vol. 17, No. 10 (1983) 828–31, for example, a reaction is described in which chloroform is degraded in an aqueous suspension of titanium dioxide by photoassisted, heterogeneous catalysis. Chloroform is a main by-product occurring in the disinfecting chlorine treatment of drinking water and also, for example, water in swimming pools. Chloroform is ascribed carcinogenic characteristics. This method is applicable to aqueous suspensions with high particle content, known as slurries. A disadvantage of this method is the production of hydrochloric acid, which must be removed from the system.

European Patent Application 89100265.1 discloses a method and apparatus for the removal of hydrogen sulfide from exhaust gases using a titanium dioxide catalyst applied on the surface of a honeycomb support of activated charcoal, and ultraviolet radiation. The activated charcoal adsorbs odorous compounds, such as $H_2S$ and scatoles, which are degraded by ultraviolet light. The method is a selective method and has the disadvantage that only part of the total surface can be utilized for the reaction.

In German patent 40 23 995.0, a method is disclosed in which pollutants are photocatalytically mineralized by a fixed-bed catalyst which is moved relative to the photon source. Compared to other methods for the destruction of pollutants, such as incineration, this method has the advantage that it does not create additional environmental pollutants. These occur in incineration when auxiliary fuel is required, which usually results in the production of carbon dioxide. The method described in the cited German patent does not require auxiliary fuel, even when the pollutant occurs in very low concentrations, and is carried out at relatively low temperatures. Liquid or solid mineralization products such as phosphoric and arsenic acid, however, can accumulate on the photocatalyst if pollutants are continually employed which, in addition to carbon, hydrogen, oxygen, and nitrogen, contain, e.g., halogens, sulfur, phosphorus, or arsenic, as well as pollutants and other wastes consisting solely of these latter elements. The low reaction temperature, generally below 50° C., does not allow these substances to evaporate. As a result, the photocatalytic function is increasingly inhibited, and the reaction finally stops completely.

There are several known methods for removing pollutants and contaminants from exhaust gases and other media in which they are undesirable.

These include purely physical methods such as adsorption or absorption, or purely chemical methods such as chemisorption or incineration. These methods, however, are frequently unsuitable for mineralizing or removing complicated chemical compounds, such as sulfur hexafluoride, by economically or ecologically acceptable means. These methods have other disadvantages as well. Physical sorption methods are limited by sorbent capacity. The loaded sorbent must either be disposed of, frequently as hazardous waste, or be desorbed, a process requiring large amounts of energy. The alternative incineration methods, on the other hand, frequently lead to high expenditures for cleaning the exhaust gases of the pollutants and of the auxiliary fuel. The normally high incineration temperatures result in extremely high energy expenditures if the incineration warmth is not utilized.

All of the stated methods and apparatus in the art have certain disadvantages in their scope of application, service life, and the resulting total space-time yield, significantly reducing their cost-effectiveness.

Taking the shortcomings of other methods into consideration, it is the object of the present invention to provide a method and apparatus for carrying out the invention which circumvent the stated disadvantages, are more universally applicable, allow the resulting products to be easily removed from the system, and allow the mineralization of even difficult chemical substances, such as inert halogen-carbon compounds, halogenated hydrocarbons, or $SF_6$.

SUMMARY OF THE INVENTION

The object of the present invention is realized by a method for the purification of gases, exhaust gases, vapors, and brines, contaminated with or containing undesirable chemical substances, by means of photocatalytic reactions occurring on the surface of catalysts, wherein the substrate to be purified is fed through a physically closed system consisting of:

a) a catalyst carrier with a high specific surface relative to the material used, which is long-term resistant to chemical corrosion and shortwave light, and which shows the mechanical stability needed for mobile mechanical parts;

b) a catalyst applied to the catalyst carrier and consisting of at least one oxide and/or mixoxide with semiconductor behaviors mixed and/or loaded with a metal of the platinum series of the VIII group of the periodic table of chemical elements;

c) a catalyst applied to the catalyst carrier and consisting of at least one element of the lanthanides, actinides, and the IIIb group of the periodic table of chemical elements;

d) at least one source of shortwave light of wavelength from 250 to 400 nm, as a photon source;

e) at least one washing zone for the catalyst carrier in accordance with a), on which catalysts are applied in accordance with b) and c), through which the catalyst carrier is transported and treated with polar solvents.

The catalyst carriers consist of mats, knitted or comparable wovens or nonwovens, preferably in packets of stainless steel, titanium, tantalum, niobium, zirconium, hafnium, or metals of the VIII group of the periodic table of chemical elements, such as palladium or platinum. The surface of the catalyst carriers is roughened in order to increase the surface area and to improve the adhesion of the applied catalysts. The surface is roughened mechanically and/or chemically-oxidatively. Examples for chemical roughening are acidic etching and for oxidative roughening annealing in an oxidative medium. The catalyst carrier packets or bundles are fixed in frames, on glass plates or similar apparatus, which consist of noncorroding materials and are resistant to shortwave light.

Porous materials in tubes, for example, can be used as catalyst carriers as well. The catalyst carriers can consist of thick porous tubes or porous sheets. The porous sheets can be joined to form sheet systems as in heat exchangers.

In special cases, particularly in cases of low oxidative media, the catalyst carrier can consist of porous carbon or carbon fibers. Porous ceramics with zeolite structures or closed cell organic or inorganic polymers or polycondensation materials can be used as catalyst carriers as well.

In the method of the present invention, the catalyst carriers occasionally serve as catalysts themselves, e.g., metals containing partially oxidized titanium or zirconium or etched precious metals containing platinum or palladium. Partially oxidized and etched metals have a very high specific surface and are therefore surface-active.

Catalysts are applied to the catalyst carriers and consist of semiconductor oxides mixed and/or loaded with a metal of the platinum series of the VIII group of the periodic table of chemical elements. The oxides are of the formula:

$M_2O_x$, and $M_1M_2O_x$, where $M_1$—elements of the Ia, IIa and IIb group of the periodic table $M_2$—Ti, Zr, Hf, V, Nb, Ta, and those of the IIIb group such as yttrium and scandium.

The platinum series consists primarily of palladium, platinum, rhodium, and ruthenium.

x—means a stechiometric or understechiometric value

When chemical compounds are used which are extremely difficult to degrade, e.g., $SF_6$ or halogen-carbon compounds containing various halogens, an additional catalytic component is added to the catalytic system consisting of a salt, usually as chlorides of a lanthanide and/or an actinide element. The chlorides are converted to oxides and applied to the catalyst carrier.

The degradation reaction employed in the method of the present invention is induced by shortwave light usually supplied by low-pressure quartz lamps. Normally, light sources with a wattage between 200 and 1000 W are used, depending on the size of the purification apparatus and the geometry of the light sources. The use of several light sources of low wattage is preferable to the application of a few light sources of high wattage, mainly to avoid heat build-up within the purification unit.

The method of the present invention can be employed not only in fixed-bed but also in fluidized-bed catalytic methods as well. In fluidized-bed methods, the catalyst is suspended in the reaction medium. Fluidized-bed catalysis has the advantage over fixed-bed catalysis that higher concentrations of catalytic particles per unit of bed volume can be achieved. The catalytic fluidized bed, however, requires a relatively constant air or gas flow through the fluidized particle bed. Occasionally, the flow rate of the reaction medium may be too high.

In these cases, particle mobilization is achieved by inducing vibrations in all or some of the fluidized-bed catalyst carriers. This is achieved by inducing vibrations inductively or piezoelectrically and is independent of the direction of flow, which may be in or against the direction of acceleration under normal gravitational conditions or in a centrifuge. To reduce noise emission, the vibrations within the fluidized bed may also be stimulated by an ultrasonic transmitter. When the flow is conducted horizontally over or through a particle bed surface, it is possible to deposit the bed coating as a continuous surface. The vibratory bed has an advantage over the fluid-dynamically stimulated fluidized bed in that the requirements placed on particle fractionation are less stringent. If the catalytic particles are at least partially on ferromagnetic catalyst carriers, moving lines of magnetic flux may be used as an additional particle stimulation method for mobile beds. The movement of the lines of magnetic flux forces the particles of the catalytic bed to constantly rearrange themselves and, consequently, continuously present new surface areas to the photons. The catalyst carrier and catalytic load are continuously or discontinuously washed to regenerate the catalysts, as in the fixed bed catalytic method. Washing is conducted with polar solvents, preferably with water. The reactivation of the catalysts is improved if the washing medium contains oxidizing substances, for example, $H_2O_2$ or ozone. The catalysts are washed according to various process principles. For example, the catalyst carriers and catalysts are bathed, or dipped in a bath, or sprayed, or sprayed and centrifuged. In most cases, the substances to be removed are highly soluble, inorganic compounds. If the mineralization is unfavorable, due to the composition of the substrate's contaminant, the coating of the catalyst may be less soluble. In these cases, but also to generally accelerate mineralization, an aid, such as water vapor, ammonia, or liquid ammonia, may be added to the purification substrate.

The washing of fluidized-bed catalysts is best conducted by exchanging the catalyst batch. Fluidized-bed catalytic methods are preferably employed when gases occur as sole mineralization products.

When the substrate gas consists, for example, of pure gas, air, oxygen-enriched air, and polluted water is sprayed into the substrate gas, the method becomes a purification method for liquid substances, in a reversal of the substrate admission in the purification method of the present invention.

In all, the method of the present invention is the method of choice for the special requirements of substrates which are to be purified.

A further object of the present invention was to provide apparatus with which the method may be carried out.

This object was realized by apparatus for carrying out the various applications of the method as described, the apparatus consisting of the following principal components:

f) a closed housing of a corrosion-resistant material, equipped with inlet and outlet nozzles for the substrate and purificable product, as well as with bearings and clamps for the catalyst carriers and catalysts, and with a source of shortwave light;

g) a frame to hold the catalyst carriers and catalysts;

h) an apparatus to move the catalyst carriers and catalysts within the housing f); and i) at least one source of shortwave light in the wavelength range from 250 to 400 nm.

Except for the fluidized-bed method, the housing according to f) contains a cavity for the bathing liquid, which is equipped with inlet and outlet nozzles for the bathing liquid.

The catalyst-containing carrier is held in a frame, cage, or is otherwise secured, and moved through the bath in the cavity in such a way that, as a minimum, the entire carrier passes through it.

Alternatively, the washing of the catalyst may be conducted by a spraying method. The spray drips into the cavity, from which it is removed or returned to the process by re-circulation.

Due to the long-term effectiveness of the catalysts, washing by bath or spraying may be conducted in intervals.

The frame frequently is a cylindrical body with a central axle, a cavity surrounding the axle, followed by a round container, which may be subdivided into pockets and which is connected to the axle on both sides, resulting in a closed container 14 whose outer 62 and inner 63 cylinder casings are constructed in such a manner that they are easily permeable for gases and can easily contain and secure the catalyst carriers and catalysts.

The frame holding the catalyst carriers and catalysts may be constructed in various geometric forms, for example, a square object in a packet which travels up and down within the housing and is thereby submerged in the washing liquid. When applying such variations of the method, it must be guaranteed that the purification process is interrupted during the washing process or that multiple systems are in service so the substrate to be purified is fed to an available purification unit by synchronized switching.

Frames are not required in the fluidized-bed method. The catalyst carriers and catalysts are suspended within the container and require a supporting base plate or drum which must be permeable for gases but impermeable for particulate matter.

The method can be conducted in reductive as well as in oxidative media, for example, when purifying extremely inert chlorofluorohydrocarbons. These compounds are best mineralized under oxygen-free conditions and in the presence of $H_2S$, $CS_2$, COS, or mixtures thereof. The presence of water and/or ammonia also promotes the reaction. Other reductive agents which helps to eliminate halogens, are for example, dithiols, mercaptans, thiophenols and their alkali salts, sodium sulfide, and sodium polysulfide, which are introduced to the process as gases or, for example, as aqueous solutions. By reversing these conditions, these sulfur compounds, if occurring as unwanted pollutants, can be eliminated by the method of the present invention. This is especially important, since these compounds are extremely odorous.

Many gases contain significant amounts of the covalently bound pollutants as aerosols. In a variation of the method of the present invention, precipitation of these components can be promoted by connecting the catalyst fixed bed to a voltage differential. Depending on the geometry of the fixed bed, the backplate electrode may be either the itself, or appropriately positioned wires, or even an additional catalyst fixed bed, as shown in FIG. 3.

Surprisingly, the new method functions even if the aqueous phase, the bath or the washing liquid used to spray the catalyst, is polluted with organochemical substances. The pollutants are adsorbed from aqueous solution and adhesively bound by the catalyst carrier and the catalyst. Even oil films on the surface of the water or substances dissolved in the aqueous solution, for example, are adsorbed by the catalyst fixed bed, appear in the gas phase, and are mineralized under the influence of the photons. This variation shows the applicability of the method for purifying extremely polluted waste water, which would be difficult by any other means.

BRIEF DESCRIPTION OF THE DRAWINGS

Examples of the apparatus required for carrying out the method are illustrated in FIGS. 1 to 7 wherein.

DETAILED DESCRIPTION OF THE PREFERRED EMBODIMENTS

Figure 1:
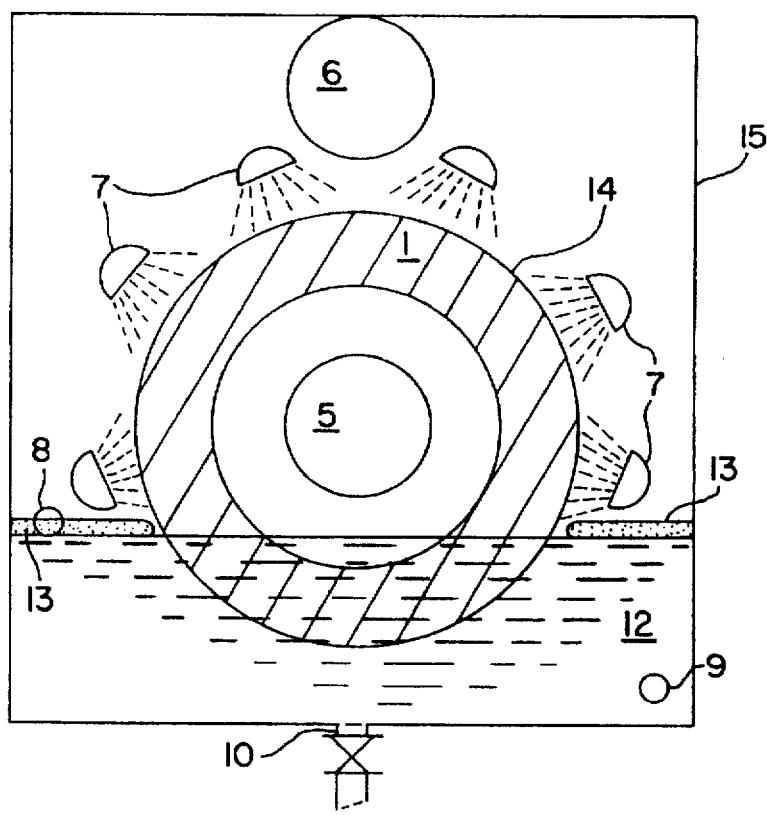
FIG. 1 shows a standard apparatus.

FIG. 1 shows a standard apparatus for effecting the method according to the present invention. In the apparatus shown in FIG. 1, a reaction chamber 11 is hermetically closed by a bath 12 and a side wall of the cylindrical container 14. The hermetic enclosure of the reaction chamber forces the substrate to travel through the fixed catalyst bed 1 irradiated by photon-emitting lamps 7. This is were the photocatalytic mineralization of the undersizable substrate components occurs. The purified product leaves the purification unit 15 via the hollow axle 5. The fixed catalyst bed and the catalysts are washed in the bath 12 and are freed of minerals, which are removed with the washing liquid through a nozzle 10.

The applications of this new method are extremely diverse. The fixed-bed catalyst method is used in households for air purification as well as for flue gas dust collectors. In vehicles, it is used for purifying circulated air and exhaust gases. In public buildings, e.g., schools, parking garages, and hospitals, it is used for purifying circulated air and emissions. Fixed- and fluidized-bed catalytic methods are also employed in several other sectors, for example, in paint factories and paint shops, in glue factories and in glueing, and in the production of printing inks and in printing to remove solvent and softener vapors. They are also used in the chemical and pharmaceutical industries, in refineries, and in coking plants to remove all types of pollutants, employing as required a variation of the method of the present invention. They are also used for occupational safety, for example, in welding. Other applications are the decontamination of ground water and soil by abandoned pollutants or following accidents. Further applications are the destruction of chlorofluorohydrocarbons, PCBs, or other environmental poisons, dangerous by-products of semiconductor production, such as $AsH_3$, $SiCl_4$, $SiHCl_3$, $SiH_4$, $SF_6$, $MoF_6$, the flue gases of viscose production, which contain $CS_2$ and $H_2S$, the black liquors occurring in cellulose production, and waste waters in electroplating shops tanneries and pesticide pollution.

The destruction of gases for chemical warfare or nerve gases which contain phosphorus are additional fields of application. The method is also called for in clean-room technology, since a precleaning step would significantly reduce even residual traces of micro-particles. The new method is a significant contribution to solving environmental pollution problems and is extremely energy-saving and cost-effective. The following examples will demonstrate some of the capabilities of the method and its apparatus.

Figure 3:
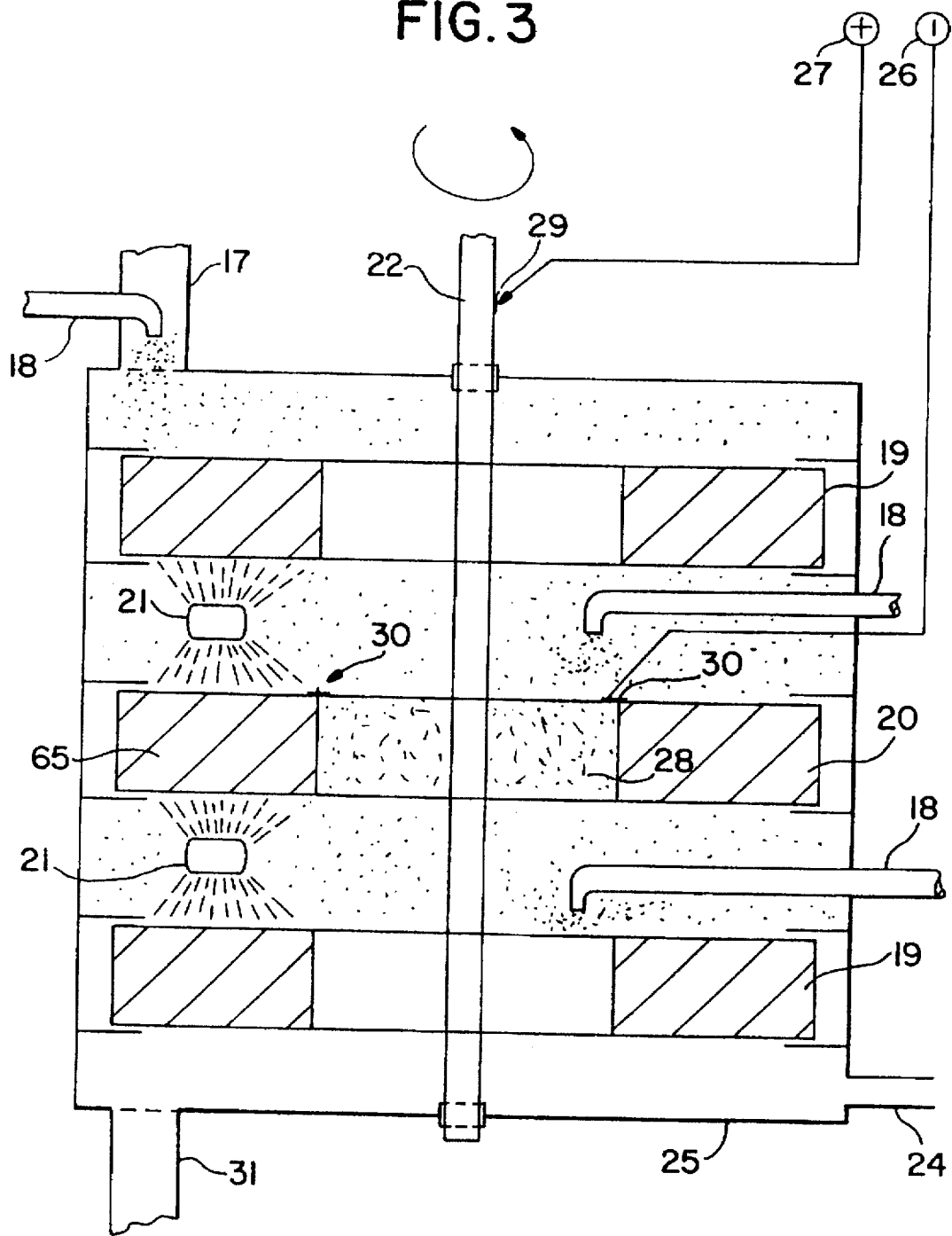
FIG. 3 shows a variation of the apparatus for the purification of covalently bound pollutants in aerosols. Purification is best conducted with an electric field as described in Example 8.

| Akte case ET-OES | Positions-Zahlen-Liste \| Stichwort - key-word Photocatalytic method and apparatus | List of reference numbers \| Anmeider Applicant OESTE, Franz Dietrich |
|---|---|---|
| Pos. | | Benennung/Designation |
| 1 | | catalyst fixed bed |
| 2 | | axial face seal |
| 3 | | motor |
| 4 | | strap or gear disk |
| 5 | | hollow axle |
| 6 | | substrate inlet nozzle |
| 7 | | shortwave lamp photon source |
| 8 | | washing liquid inlet |
| 9 | | washing liquid outlet |
| 10 | | bath outflow |
| 11 | | gas phase chamber |
| 12 | | catalyst washing bath |
| 13 | | isolating float |
| 14 | | cylindrical catalyst bed carrier |
| 15 | | apparatus housing |
| 16 | | pure product outlet nozzle |
| 17 | | substrate to be purified |
| 18 | | spray nozzles |
| 19 | | catalyst fixed bed, FIG. 3 |
| 20 | | catalyst carrier cylinder |
| 21 | | photon surce, FIG. 3 |
| 22 | | rotating main axle |
| 23 | | aperture to 2nd purif. stage |
| 24 | | washing liquid outlet |
| 25 | | housing, FIG. 3 |
| 26 | | negative voltage source |
| 27 | | positive voltage source |
| 28 | | isolating plastic sleeve |
| 29 | | sliding contact |
| 30 | | sliding contact |
| 31 | | pure product outlet |
| 32 | | pockets for catalyst fixed bed |
| 33 | | substrate inlet |
| 34 | | crude gas chamber, 1st purif. stage |
| 35 | | |
| 36 | | |
| 37 | | aperture to 2nd purif. stage |
| 38 | | seal |
| 39 | | catalyst washing bath |
| 40 | | washing liquid inlet |
| 41 | | washing liquid outlet siphon |
| 42 | | crude gas chamber, 2nd purif. stage |
| 43 | | mineralization aid inlet |
| 44 | | stirring rotor |
| 45 | | photon source |

-continued

Figure 4:
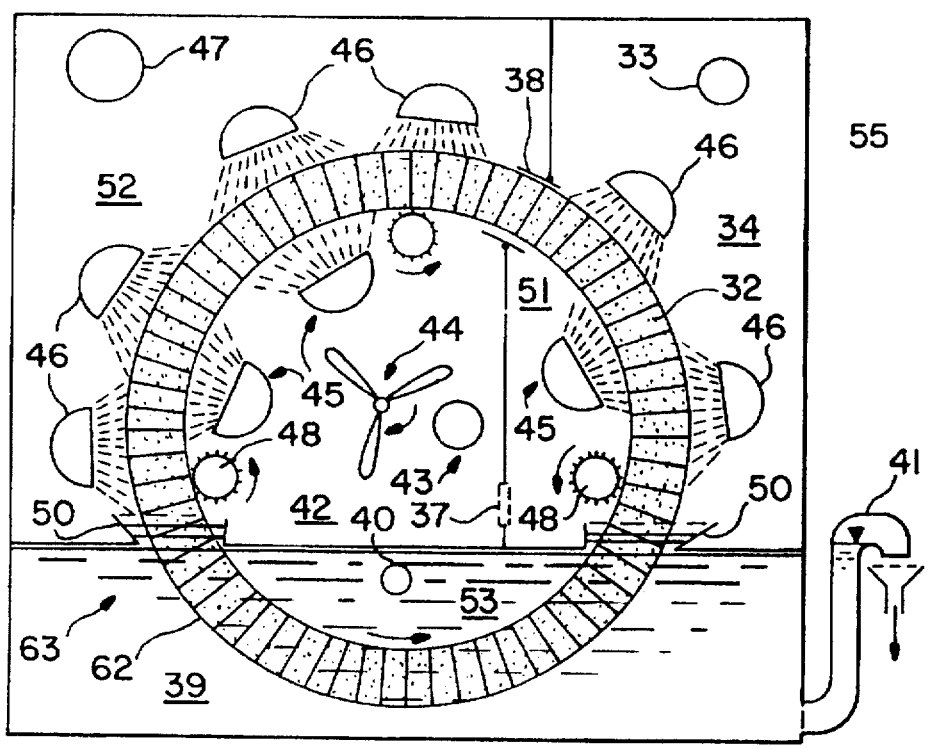
FIG. 4 shows a variation of the apparatus for pollutants which are extremely difficult to eliminate. The apparatus is designed such that purification is conducted in two stages. The first purification stage occurs between chamber areas 34/51, and the second stage occurs between chamber areas 42/52. The method is described in detail in Example 5.
Figure 5:
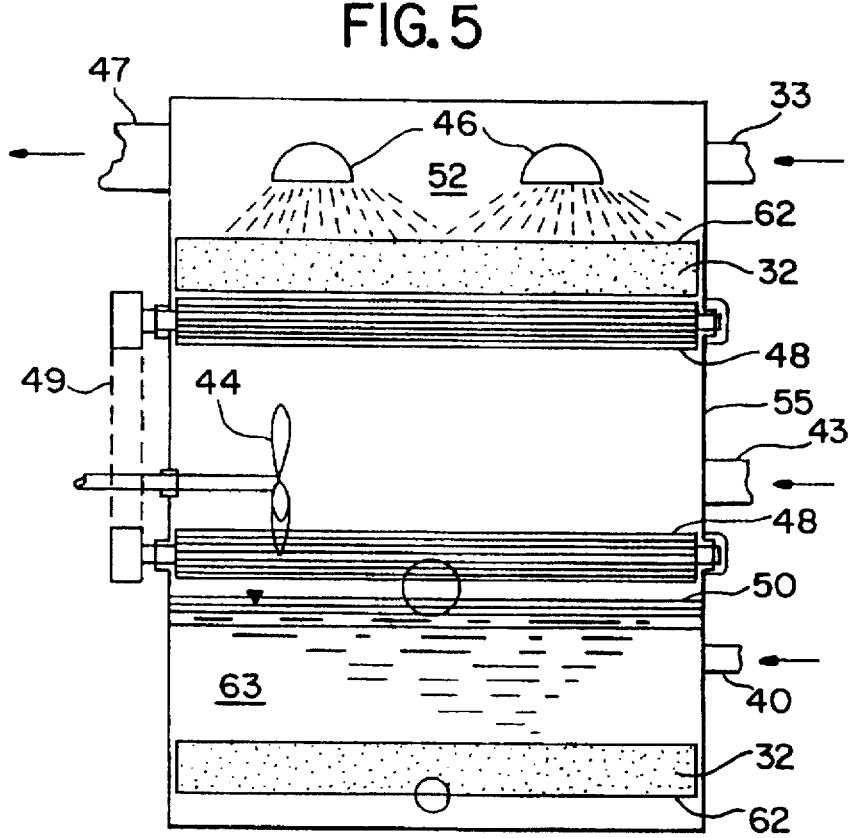
FIG. 5 shows a vertical cross section of the apparatus of FIG. 4.
Figure 6:
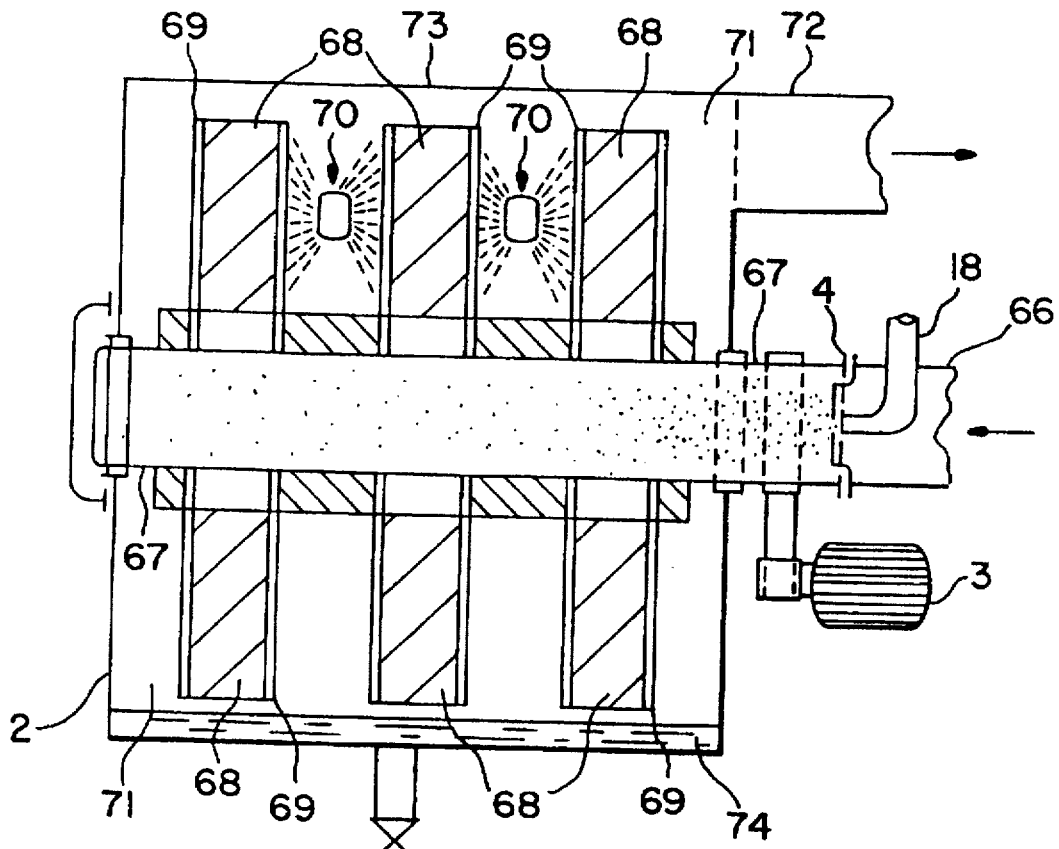
FIG. 6 shows a variation of the apparatus in which the washing liquid is admitted through the same inlet as the substrate to be purified. The catalyst carrier and catalyst are washed by spinning off the washing liquid as described in Example 9.
Figure 7:
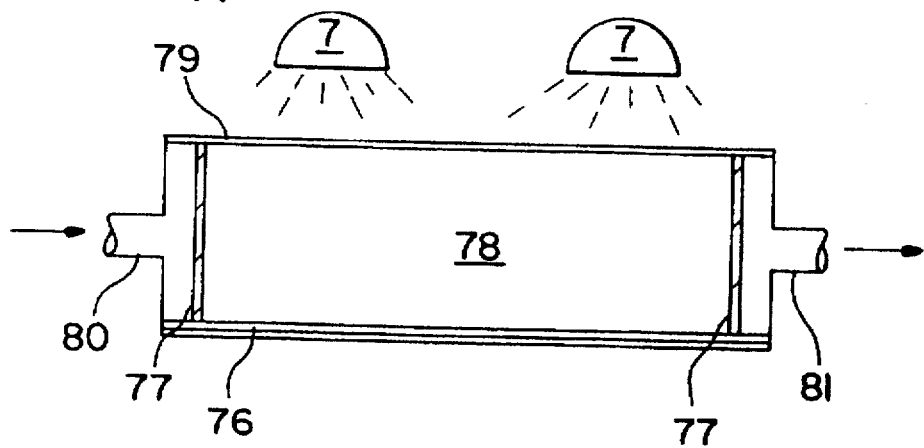
FIG. 7 shows an apparatus which uses fluidized-bed catalysts.

| Akte case ET-OES | Positions-Zahlen-Liste \| Stichwort - key-word Photocatalytic method and apparatus | List of reference numbers \| Anmeider Applicant OESTE, Franz Dietrich |
|---|---|---|
| Pos. | | Benennung/Designation |
| 46 | | photon source |
| 47 | | pure product outlet |
| 48 | | centering drive rollers |
| 49 | | drive transmission |
| 50 | | leveling lock |
| 51 | | pure gas chamber, 1st stage |
| 52 | | pure gas chamber, 2nd stage |
| 53 | | bath |
| 54 | | |
| 55 | | housing, FIG. 4 and 5 |
| 56 | | |
| 57 | | |
| 58 | | |
| 59 | | |
| 60 | | supporting axle |
| 61 | | plain bearing |
| 62 | | outer cylinder casing |
| 63 | | inner cylinder casing |
| 64 | | |
| 65 | | middle catalyst bed |
| 66 | | substrate inlet nozzle |
| 67 | | hollow axle |
| 68 | | catalyst beds |
| 69 | | quartz glass plates |
| 70 | | UV lamps |
| 71 | | pure product chamber |
| 72 | | pure product outlet |
| 73 | | apparatus outer casing |
| 74 | | apparatus bottom |
| 75 | | washing liquid outlet |
| 76 | | vibrating base plate |
| 77 | | mesh bottom plates (frits) |
| 78 | | catalyst fluidized bed |
| 79 | | quartz glass plate |
| 80 | | crude gas inlet |
| 81 | | pure gas outlet |
| 82 | | |
| 83 | | |
| 84 | | |
| 85 | | |
| 86 | | |
| 87 | | |
| 88 | | |
| 89 | | |
| 90 | | |

EXAMPLE 1

Preparation of the Catalyst Carrier

A three-dimensional, knitted wire mat of stainless steel with a layer thickness of 50 mm is cut into strips of 150 mm width and 1000 mm length. The mesh is ca. 10 mm. The strips are used to form a hollow cylinder with the following dimensions: outer diameter ca. 30 cm, inner diameter ca. 20 cm, cylinder height ca. 15 cm. The mat is held in shape by meshed stainless steel wires. The cylinder is then blasted with grey cast iron blasting shot, mesh 0.2 to 0.4 mm, until the surface of the wire mat is well roughened, recognizable by the delustering of the wires. Following this pretreatment, the diameter of the knitted wires is ca. 0.2 mm. The wire mesh is then washed and thoroughly dried. The wire mesh is then dipped into a solution of soluble sodium, density 1.4 kg/l, and thoroughly wetted.

Short activated charcoal fibers with an average length of 1.0 to 3.5 mm, which are best produced by cutting fibrous webs of activated charcoal, are added to a 5% aqueous solution of citric acid. The charcoal fibers sediment completely in the citric acid solution and are then removed by decanting and filtration. The fibers are then dried to a constant weight at 70° C. The fibers are shaken through a sieve onto the wire mat, which has been wetted with the soluble sodium solution, until the surface of the wires is covered with the short charcoal fibers as completely as possible. Prepared in this manner, the wire mat is then sprayed uniformly with a 5% aqueous solution of soluble sodium, followed by a 5% aqueous solution of citric acid. It is then dried to a constant weight at 110° C. This method produces a thin silicate layer on the flock coating of charcoal fibers.

Subsequently, the wire mat is repeatedly dipped into a water bath to remove all soluble salts. The wire mat is then dried to a constant weight at 70° C.

Preparation of the Catalyst

A suspension is prepared containing:

5% titanium dioxide powder, rutile type, mesh smaller than 0.1 mm

Figure 2:
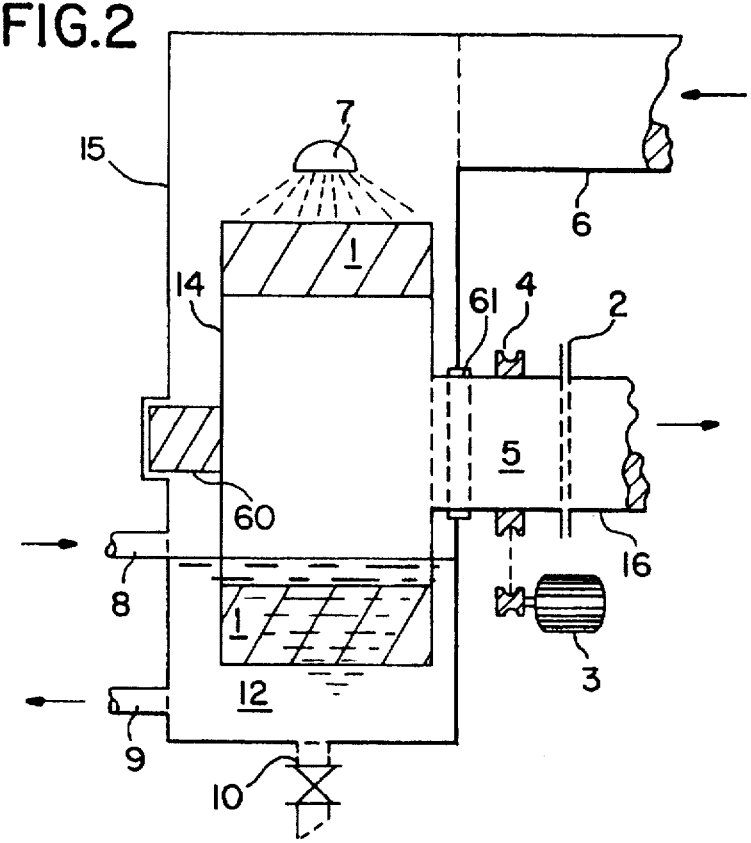
FIG. 2 shows the same apparatus in a vertical cross section along the middle axis.

10% ethyl titanate, 3% bentone swollen in xylol 0.5% palladium, metal colloid 0.5% rhodium, metal colloid and 81.0% xylol Depositing the Catalyst on the Catalyst Carrier The catalyst suspension is deposited on the catalyst carrier by spraying or dipping and is dried at a temperature between 20° C. and 50° C. and a relative humidity of 50% to 95%. After the catalyst carrier and catalyst have been prepared as described, they are built into the apparatus components shown in FIGS. 1 and 2, container 14.

Procedure

Container 14 with catalyst carrier and catalyst 1 is mounted on a rotatable axle 60 supported by bearings 61 in a closed housing 15. Catalyst carrier and catalyst form the catalyst fixed bed 1. The cylindrical container 14 is closed on both sides. The flow of substrate to be purified enters the purification unit (FIGS. 1 and 2) of housing 15 via inlet nozzle 6. Since housing 15 is hermetically sealed, the substrate can reach the hollow axle 5 only by traversing the catalyst fixed bed 1. The hollow axle 5 is also the outlet nozzle through which the substrate leaves the purification unit as a purified product. During the reaction, the catalyst fixed bed 1 is activated by several 200 W low pressure quartz lamps 7. The cylinder (container) 14 is continually rotated on cylinder axle 60 during the work phase. The axle 60 is driven by motor 3 via hollow axle 5 and strap or gear disk 4. During the work phase, the rotation dips the complete casing of the catalyst fixed bed into bath 12, which in this case is a water bath and is situated in the lower section of housing 15. The wash water enters the bath by inlet 8 at a rate of ca. 2 to 5 l/h.

After it is loaded with the mineralization products, it is removed from the bath via outlet 9. In the reaction area of the quartz lamps 7, the surface of the bath is covered with isolating floats 13 to minimize evaporation and heating. Container 14 is turned at a speed of ca. 0.5 to 1.0 times per hour. Tap water, but preferably water from an ion exchanger, is used as the washing liquid.

The process operates as follows:

An air stream is adjusted to a relative humidity of ca. 90% by feeding it through a tank of cooled water at a rate of 0.3 l/s. At a rate of 0.1 l/s, an additional stream of air is fed through a 2 liter washing flask roughly half-filled with a solution of various biocide substances. The biocide solution is of the following composition:

30% profenofos (O-ethyl-S-propyl-O-(2-chloro-4-bromphenyl)thiophosphate; $C_{11}H_{15}BrClO_3PS$), 25% chlorofos (O,O-dimethyl-2,2,2-trichloro-1-hydroxyethane phosphate; $C_4H_8Cl_3O_4P$), 5% cacodyl oxide (bis(dimethyl arsyl)oxide; $As_2(CH_3)_4O$), 25% demeton-S (O,O-diethyl-S-(ethyl thio)ethyl thiophosphate; $C_8H_{19}O_3PS_2$), 15% fluoro acetic acid-n-butyl ester ($C_6H_{11}FO_2$).

The two air streams are mixed with a static mixer and fed through the apparatus shown in FIGS. 1 and 2. A defined aliquot of the gas stream fed through the catalyst fixed bed is diverted for analysis and burned in an oxyhydrogen gas flame. The resulting gas is condensed in a quartz cooler such that the condensate drips from the cooler into a diluted hydrogen peroxide solution. The fluoride, bromide, sulphate, phosphate and arsenate content of the hydrogen peroxide solution is analyzed at two-hour intervals. The solution contains hydrogen peroxide and a small amount of potassium iodide.

Even after the experiment was conducted continually for two weeks, none of the ions mentioned above was detected in the hydrogen peroxide solution.

EXAMPLE 2

(Comparative Example)

The process is conducted exactly as described in Example 1, except that the catalyst is not washed. Pollutants were detected in the emissions after only 24 hours reaction time.

EXAMPLE 3

The process is conducted as described in Example 1, but the catalyst is washed not by bathing but rather by spraying the catalyst and catalyst carrier from the inside of container 14. The washing liquid is removed through outlet 10. Container 14 is rotates at a speed of 300 to 1500 rpm during the washing method. The washing is conducted discontinuously at intervals of 2 to 24 hours depending on the pollutant content of the substrate to be purified.

The resulting emissions are of the same quality as in Example 1.

EXAMPLE 4

The process is conducted exactly as described in Example 1, except that the catalyst is washed discontinuously. Bath 12 is filled for 15 minutes every two hours. The washing liquid is then removed. The same good results were achieved as in Example 1.

EXAMPLE 5

Preparation of the Catalyst Carrier and Catalyst

A 20 mm thick, stainless steel knitted mat is cut into strips of 38 cm length and 4 cm width and roughened by corundum streams. The toughened stainless steel strips are treated with soluble sodium as in Example 1.

1.5 kg short aluminum oxide fibers with an average length of 1 to 3 mm and a diameter of 0.1 mm are stirred into a solution of 75 g thorium tetrachloride, 30 g cerium trichloride and 15 g yttrium trichloride in 3 l of water. The solution is then neutralized by adding sodium hydroxide. The chlorides are converted into hydroxides and precipitate on the surface of the aluminum oxide fibers. The applied fibers are removed by filtration, neutralized by washing, and dried.

The dry fibers are fluidized by a vertical air stream and the stainless steel knitted mat, which was wetted by treatment with soluble sodium, is flock coated by dipping into the short fiber fluidized bed. A high fiber density is achieved by applying a relatively high voltage of 5 kV to the stainless steel knitted strips during flock coating. Immediately thereafter, the coated strips are dried to a constant weight in a $CO_2$ atmosphere at room temperature. They are then dried to a constant weight in a nitrogen atmosphere while the temperature is gradually increased to 400° C. This temperature is maintained for two hours.

The resulting strips are freed of alkali carbonates by washing and dried. Subsequently, the prepared catalyst carrier is coated and fixed with palladium- and rhodium-doped titanium dioxide, as described in Example 1.

The resulting catalyst carriers and catalysts are mounted in the 64 pockets 32 of the catalyst carrier cylinder 20 as shown in FIGS. 4 and 5. Cylinder 20 is then mounted in housing 55.

Cylinder 20 is mounted in cheer housing 55 such that sections of the cylinder are simultaneously in both of the chambers while the cylinder rotates.

Cylinder 20 divides each of the two chambers 34/51 and 42/52 into two sections, the substrate section and the product section.

Cylinder 20 rotates counterclockwise at a speed of 0.5 rpm and is driven eccentrically by the interconnected supporting rollers 48.

Procedure

Nitrogen containing 1000 ppm sulfur hexafluoride, 5000 ppm carbon disulfide, 10000 ppm ammonia, and 20 g/m³ water vapor is fed into the chamber 34 via substrate inlet nozzle 33 at a rate of 0.3 l/s and a temperature of 23° C.

The quartz lamps 45 and 46 on both sides of the chamber are turned on. The photon emission maximum is between 300 and 400 nm. The gas is fed through catalyst bed 62, where practically all pollutants are converted to elementary sulfur, ammonium fluoride, and carbon dioxide. The resulting sulfur and ammonium fluoride remain on the catalyst. The gas is then fed through aperture 37 into chamber 42 where, at a temperature of 20° C., it is mixed with air which enters by inlet 43 at a rate of 0.3 l/s and whose relative humidity has been adjusted to 100% at a temperature of 25° C. The gases are stirred by rotor 44. Without a change in photon conditions, the gas mixture is fed through catalyst bed 62 into chamber 52. The gas reaching chamber 52 does not contain sulfur dioxide or any other pollutants. Residual pollutants, as well as the elementary sulfur on the catalyst, are converted to ammonium sulfate and ammonium hydrogen sulfate in the catalyst fixed bed of chamber areas 42/52. The purified product is removed from the purification unit by outlet 47. The catalyst bed is washed continuously while moving through bath 63. The washing liquid enters upper section 39 of the bath by inlet 40 at a rate of 2 l/h, is fed through the catalyst bed where it removes mineralization products and is collected in lower section 53 of the bath.

The washing method removes mineralized salts, such as fluorides and sulfates. The resulting washing liquid is removed from the purification unit by siphon 41. Leveling locks 50 are regulated by the height of the siphon. The ammonia content of the washing liquid is monitored via the pH-value, which varies between 0.5 and 7.5. The seals 38 minimize gas leakage between the chambers.

Waste Water Processing

Milk of lime is added to the waste water. The resulting sulfates and fluorides precipitate as gypsom and fluorspar. Subsequently, the waste water is stripped in a packed column using air in a counterflow system. The stripping air, which contains ammonia, is recycled via aperture 37 and is reintroduced to the process in chamber 42.

The precipitated calcium salts are removed by filtration and disposed of. The filtrate can be used as service water.

In this manner, extremely dangerous chemical substances are converted to harmless mineral salts.

EXAMPLE 6

As in Example 5, but with the following substrate composition: 500 ppm bromtrifluoro methane (halon), 200 ppm difluoro-dichloro methane instead of sulfur hexafluoride, and 5000 ppm $H_2S$ instead of carbon disulfide.

More than 95% of the covalently bound halogens are mineralized to halogenides.

The waste water filtrate cannot be used as service water, since it contains calcium chloride and bromide.

EXAMPLE 7

As in Example 5, except that a knitted mat of titanium wire, preferably roughened, and of less than 0.5 mm diameter is used instead of a stainless steel mat. The knitted mat is annealed in oxygen, resulting in a titanium dioxide layer on the surface of the wires, which supplies the required catalytic properties in this process.

Subsequently, the wire mat is doped with one or a mixture of the platinum metals and/or oxidized compounds of the elements or their mixtures from the lanthanide group or yttrium or the actinide group, leading to the same good results.

EXAMPLE 8

Many gases contain significant amounts of the covalently bound pollutants as aerosols. For the precipitation of these components, it is advantageous to connect the photocatalyst fixed bed to a voltage differential. Depending on the geometry of the fixed bed, the backplate electrode may be either the housing itself, appropriately positioned wires, or even an additional catalyst fixed bed.

FIG. 3 shows the geometry of three catalyst fixed beds 19, 65, which rotate around a common axle 22 within housing 25. Both external catalyst beds are connected electrically with conductive metal axle 22 and, via sliding contact 29, positive voltage source 27.

Central catalyst bed 65 is isolated from metal axle 22 by plastic sleeve 28 and receives a negative charge via sliding contact 30 from voltage source 26. Two photon sources 21 are mounted rigidly between rotating catalyst beds 19, 65. Spray nozzles 18 enrich the substrate, which enters the purification unit via 17, with an aerosol of washing liquid. The rotational speed of the catalyst beds is variable between 10 and 500 rpm.

In intervals, rotational speed is increased to maximum to spin off washing liquid during washing. Subsequently, the spun-off washing liquid is removed from the apparatus by outlet 24. The purified gas is removed by outlet 31.

5000 to 30,000 V is the best voltage range for stripping aerosols.

The catalyst carriers are prepared according to Examples 1 and 5.

EXAMPLE 9

FIG. 6 shows a further variation of the method using aerosols. The substrate—polluted gas—is fed through inlet 66, hollow axle 67, and catalyst beds 68. Spray nozzle 18 enriches the substrate with an aerosol of washing liquid. The catalyst beds are mounted between disk-shaped, round quartz glass plates 69, which are securely fastened to the hollow axle. The hollow axle is permeable for gases in the catalyst bed section between the quartz glass plates.

The hollow axle and, consequently, the catalyst bed are turned by a motor and drive unit 4, as in Example 8. UV lamps 70, the photon sources, are located between the catalyst beds. The purified substrate is fed into chamber 71 and removed from the unit as a pure product by outlet 72. A filled gas washer is mounted downstream of the purification unit to strip aerosols.

The washing liquid aerosol aggregates and coalesces within the catalyst fixed bed, is spun to wall 73 of the unit, collects in bottom section 74, and is removed from the apparatus by outlet 75.

EXAMPLE 10

A variation of Example 9 is to secure the photocatalyst fixed bed by a tight, transparent housing. The catalyst is secured within glass capillaries. This is achieved by applying the catalyst to the glass walls or pores of the capillaries. When employing wide capillaries with diameters of ca. 1 mm and larger, the catalyst particles are applied by pouring. Previous etching improves the adhesion of the catalyst to the glass surface.

EXAMPLE 11

The apparatus can also serve as a waste water purification unit if, as in Example 9, the spray nozzle is fed with water to be purified and inlet 66 is fed with clean air.

I claim:

1. An apparatus for purifying fluid substances by photocatalytic reaction occurring on a catalyst surface, said apparatus comprising:
   - a closed housing formed of a corrosion-resistant material and having inlet and outlet nozzles for a purifiable substance;
   - a catalyst carrier supported in said housing and having a large surface area, the carrier being highly resistant to chemical corrosion and shortwave light and having a mechanical stability needed for mobile mechanical parts;
   - a first catalyst, applied to said catalyst carrier and consisting of a least one of oxide, mioxide or a combination thereof with semiconductor behaviors, mixed, loaded or both, with at least one metal of the platinum series of the VIII group of the periodic table of chemical elements;
   - a second catalyst, applied to said catalyst carrier, consisting of at least one element of the lanthanides, actinides and the IIIb group of the periodic table of chemical elements;
   - a frame for supporting said catalyst carrier in said housing;
   - at least one source of shortwave light of wavelengths from 250 to 400 nm, as a photon source;
   - at least one washing zone provided in said housing for said catalyst carrier and including a cavity for receiving a catalyst carrier washing liquid and provided with inlet and outlet nozzles for the washing liquid; and
   - means for moving said catalyst carrier through said at least one washing zone.

2. An apparatus of claim 1, further comprising means for flexibly supporting said frame in said housing.

3. An apparatus of claim 1, further comprising spraying means for washing said catalyst carrier and connected with said washing liquid receiving cavity.

4. An apparatus of claim 3, wherein said spraying means includes a time switch for effecting interval washing of said catalyst carrier.

5. An apparatus of claim 1, wherein said frame comprises a cylindrical body having outer and inner gas-permeable cylinder casings for receiving said catalyst carrier.

6. An apparatus of claim 1, wherein said frame comprises a square body.

7. An apparatus of claim 1, wherein said frame comprises a gas-permeable plate.

8. An apparatus of claim 1, wherein said housing comprises several sub-chambers for effecting a substrate reaction in a multi-stage process.

9. An apparatus for treating fluids for converting fluid components, said apparatus comprising:
   - semiconductor catalyst means provided for enabling the conversion of fluid components,
   - ionized electrical fields for exposing the semiconductor catalyst means; and
   - means for at least intermittently washing the semiconductor catalyst means.

10. An apparatus of claim 9, wherein the ionized electrical fields provides for at least partially and at least occasionally exposing of the semiconductor catalyst means to photon rays from a spectrum region below 400 nm.

11. An apparatus of claim 9, further comprising a photon source for creating said ionized electrical field, the semiconductor catalyst means being displaceable, at least partially, relative to the photon source.

12. An apparatus of claim 9, wherein the semiconductor catalyst means is formed as a catalyst-containing fixed bed.

* * * * *